May 16, 1939.  C. W. FREDERICK ET AL  2,158,178

LENS SYSTEM

Filed May 22, 1937

FIG. 1.

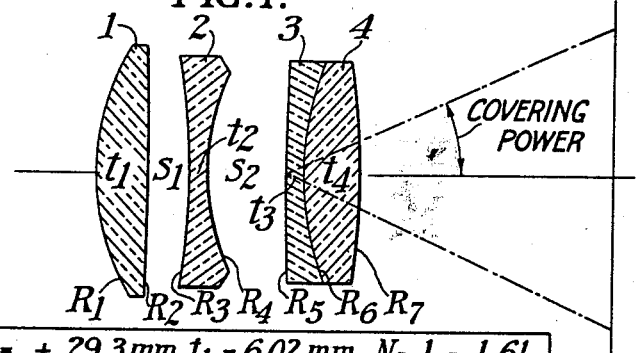

| | | |
|---|---|---|
| $R_1 = +29.3$ mm | $t_1 = 6.02$ mm | $N_D 1 = 1.61$ |
| $R_2 = -946.$ · | $s_1 = 5.27$ · | $v\ 1 = 57.2$ |
| $R_3 = -75.4$ · | $t_2 = 1.89$ · | $N_D 2 = 1.58$ |
| $R_4 = +27.7$ · | $s_2 = 9.91$ · | $v\ 2 = 41.4$ |
| $R_5 = +1180.$ · | $t_3 = 1.89$ · | $N_D 3 = 1.80$ |
| $R_6 = +36.1$ · | $t_4 = 6.97$ · | $v\ 3 = 25.5$ |
| $R_7 = -69.0$ · | | $N_D 4 = 1.84$ |
| | | $v\ 4 = 35.5$ |

FIG. 2.

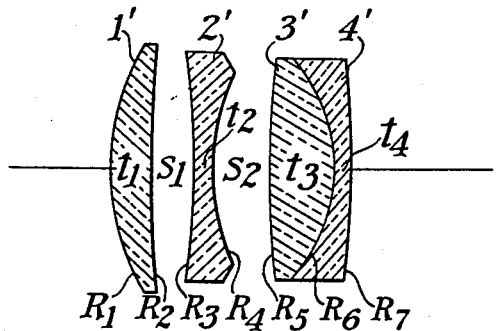

| | | |
|---|---|---|
| $R_1 = +29.8$ mm | $t_1 = 5.00$ mm | $N_D 1 = 1.62$ |
| $R_2 = +300.$ · | $s_1 = 5.20$ · | $v\ 1 = 60.4$ |
| $R_3 = -76.4$ · | $t_2 = 2.00$ · | $N_D 2 = 1.58$ |
| $R_4 = +27.5$ · | $s_2 = 7.12$ · | $v\ 2 = 41.4$ |
| $R_5 = +155.4$ · | $t_3 = 8.00$ · | $N_D 3 = 1.84$ |
| $R_6 = -19.7$ · | $t_4 = 2.00$ · | $v\ 3 = 35.5$ |
| $R_7 = -108.6$ · | | $N_D 4 = 1.74$ |
| | | $v\ 4 = 28.2$ |

Charles W. Frederick
Willy Schade
INVENTORS

BY Newton M. Perrins
Rolla H. Carter
ATTORNEYS

Patented May 16, 1939

2,158,178

UNITED STATES PATENT OFFICE 2,158,178

LENS SYSTEM

Charles W. Frederick and Willy Schade, Rochester, N. Y., assignors to Eastman Kodak Company, Rochester, N. Y., a corporation of New Jersey Application May 22, 1937, Serial No. 144,201

5 Claims. (Cl. 88—57)

This invention relates to optical systems and particularly to photographic objectives.

It is an object of the invention to provide an objective which is highly corrected for coma, chromatic aberration and spherical aberration.

It is a particular object of the invention to provide a lens which is more highly corrected than hitherto for astimgatism and flatness of field and which has a relatively large covering power.

Throughout this specification the term "covering power" is used in its preferred sense to mean the maximum angle from the optical axis at which the image definition is critical within given tolerance limits. Some of those engaged in this art have used the term "covering power" to mean the total angular field which has a value equal to twice the above maximum angle. Hence, care must be exercised to avoid confusion between these two conventions when comparing published values of "covering power."

In addition to the aberrations described as chromatic aberration, spherical aberration, coma, astigmatism, field flatness, and distortion, those engaged in lens designing recognize certain defects which appear in mathematical computations as some form of inter-relation between certain of these aberrations. One of these which, in a certain sense, fundamentally controls the flatness of field, but which also cooperates with and/or is related to the astimgatism is sometimes called Petzval curvature. The term, Petzval radius, "$R_P$" refers to the reciprocal of the Petzval sum and is defined as follows:

$$R_P = \frac{1}{\sum \frac{N_k - N_{k-1}}{N_k N_{k-1} R_k}}$$

where N equal index of refraction, R equals curvature, subscript $k$ refers to the successive refractive surfaces and $\Sigma$ is used in its usual sense to mean the summation of the values for all surfaces of the lens. It is obvious from this definition that Petzval curvature is actually a specification of the lens similar to its overall length. However, we shall follow accepted custom and also use this term to describe that particular aberration or defect mentioned above which seems to be measurable in terms of the value of this mathematical expression. For convenience in the accompanying claims, we refer to each Petzval term, $$\frac{N_k - N_{k-1}}{N_k N_{k-1} R_k}$$

as the Petzval power of the surface $k$, the sum of these Petzval powers being the Petzval sum.

The effect of Petzval curvature may best be described by quoting the following excerpt from Conrady "Applied Optics and Optical Design" (published 1929)—"The singularly obstinate defect measured by the Petzval sum has no effect of any kind upon the sharpness or definition of individual image-points; in the absence of astigmatism it simply causes the image of a plane object to be formed upon a curved surface instead of the usually desirable flat surface. When astigmatism is also present, then the sagittal and tangential foci of any one oblique pencil are formed always on the same side of the Petzval surface and at distances which are in a one-to-three ratio— just as for sagittal and tangential coma." Under certain conditions defined mathematically,— "The curvature of field is aggravated; but if the astimgatism is under control, then a judicious amount of"—change of these mathematical conditions—"affords the only means of minimizing the Petzval curvature in the great majority of optical systems in which the Petzval sum must be accepted at whatever value it assumes. Correction for flatness of the tangential field is usually the best compromise".

Practically this method of minimizing the Petzval curvature produces almost negligible results. It is common practice to seek methods of minimizing the effect of Petzval curvature, since there are many difficulties encountered in attempting to change the Petzval radius or curvature itself. On the other hand, according to the present invention, the Petzval radius is effectively changed and increased, the spherical aberration is decreased, the astigmatism is decreased and the covering power and field flatness are maintained constant or even improved somewhat.

It is well known that prior to our invention, if one attempted to reduce spherical aberration or astigmatism beyond a certain limit by increasing the Petzval radius, the field would bend over backward causing the lens to be worthless, particularly at wide angles. Our invention provides a lens which, for a given aperture, has a flatter field to a greater angle (i. e. wider covering power), has reduced astigmatism and has reduced spherical aberration. The reduction in spherical aberration is perhaps incidental but is nevertheless one of the useful effects obtained by the invention.

The invention may be applied advantageously to many types of lenses. The benefits which are derived vary in amount and form depending on the type of lens to which the invention is applied. However, certain of these advantages and features occur to a greater or less degree in most if not all lens systems in which the Gauss points are contained within the physical outline of the system (i. e. not in front of or behind the system). In fact, such a system may be only part of a larger system such as the front component of a telephoto lens. In this case the Gauss points of the component are within the component although the Gauss points of the whole telephoto system are probably in front of this component. These generally obtainable advantages will be discussed toward the end of this specification. On the other hand, of the advantages which are obtained only in one type or appear in different forms in different types of lenses, only those which are pertinent to the type of lenses shown in the accompanying drawings will be discussed.

Two types of lenses with which our invention has proven to be particularly useful are illustrated in the accompanying drawing in which, Fig. 1 shows a lens incorporating the invention.

Fig. 2 shows another embodiment of the invention incorporated in a modified form of the type lens shown in Fig. 1.

The above definition of covering power is illustrated in Fig. 1 and may be defined as one-half the angle subtended at the rear Gauss point by the image field. The lens shown in this figure has the following characteristics for a focal length of 100 mm. and a relative aperture of f. 3.5.

| Lens | Glass | Radii | Thickness and separation |
|---|---|---|---|
|  |  | Mm. | Mm. |
| 1 | $N_D = 1.6109$ <br> $\nu = 57.2$ | $R_1 = + 29.3$ <br> $R_2 = - 946$ | $T_1 = 6.02$ <br> $S_1 = 5.27$ |
| 2 | $N_D = 1.5750$ <br> $\nu = 41.4$ | $R_3 = - 75.4$ <br> $R_4 = + 27.7$ | $T_2 = 1.89$ <br> $S_2 = 9.91$ |
| 3 | $N_D = 1.8049$ <br> $\nu = 25.5$ | $R_5 = +1180$ <br> $R_6 = + 36.1$ | $T_3 = 1.89$ |
| 4 | $N_D = 1.8417$ <br> $\nu = 35.5$ | $R_7 = - 69.0$ | $T_4 = 6.97$ |

Throughout this specification and the accompanying claims, the usual convention of signs is employed, namely: a surface which is convex to the incident light has a positive radius of curvature, a concave surface has a negative radius of curvature and the "absolute value" of a radius of curvature is positive independent of whether the surface is convex or concave.

The difficulties involved in the design of any lens are known to those skilled in the art and those which we encountered need not be discussed in detail here. By choosing and balancing certain arrangement of the elements, certain indices of refraction, certain dispersive powers, certain powers for the various lens components, certain radii for these components determined by bending the individual elements, and certain lens thicknesses and air spacings, and endeavoring to control the Petzval sum,—by doing all this, we are able to get a lens more highly corrected over a greater field than hitherto. Furthermore, we have taken into consideration the fact that in addition to the variations in astigmatism on the principal rays with angle of incidence, there is for each such angle, another variation in astigmatism with the spherical aberration occurring at that angle.

As pointed out above, covering power depends on the tolerance limits. For purposes of definition and by way of example, we shall assume that such tolerance limits are reached when the sagittal and tangential fields (sometimes called secondary and primary fields respectively) deviate more than one per cent of the focal length of the system. Obviously, a similar set of definitions and specifications could be set up using ¾ per cent of the focal length as the tolerance limit, without departing from the spirit of this invention. It is well known that the final computation of a lense is made after the tolerance limits and/or covering power are decided and when computed, the resulting covering power and aberrations are accepted. A change in tolerance limits and/or desired covering power requires a new computation of the lens.

The lens shown in Figure 1 comprises certain curvatures, refractive indices, lens thicknesses, air spacings, and a Petzval sum according to the invention, and also the individual components have been "bent", whereby the Petzval radius has been increased to more than 3.9 times the focal length and thus the covering power has been extended to beyond 24 degrees, whereas previously such lenses would have a covering power of about 22.5 degrees. Furthermore, the astigmatism at 18 degrees off the optic axis has been reduced from 1% to less than ½% and the spherical aberration at f. 4.5 from about —.5% to —.3% and at f. 3.5 from +.6 to +.4% of the focal length. The 18° angle is here chosen in this example, because at or near this angle the astigmatism is greater than at any other point within the zero-astigmatism zone which occurs at about 22°.

These advantages are obtained when the algebraic difference of curvature of the surfaces of lens 4 is small, i. e., when $$F\left(\frac{1}{R_6} - \frac{1}{R_7}\right)$$

is less than 5 ($R_7$ being negative in the example shown).

Figure 2 shows a lens which is a modification of the form shown in Fig. 1 and in which the order of the elements in the cemented component is reversed. This lens has a focal length of 100 mm., a relative aperture of f. 3.5 and the following specifications:

| Lens | Glass | Radii | Thickness and separation |
|---|---|---|---|
|  |  | Mm. | Mm. |
| 1' | $N_D = 1.6201$ <br> $\nu = 60.4$ | $R_1 = + 29.8$ <br> $R_2 = +300$ | $T_1 = 5.00$ <br> $S_1 = 5.20$ |
| 2' | $N_D = 1.5750$ <br> $\nu = 41.4$ | $R_3 = - 76.4$ <br> $R_4 = + 27.5$ | $T_2 = 2.01$ <br> $S_2 = 7.12$ |
| 3' | $N_D = 1.8417$ <br> $\nu = 35.5$ | $R_5 = +155.4$ |  $T_3 = 8.00$|
| 4' | $N_D = 1.7398$ <br> $\nu = 28.2$ | $R_6 = - 19.7$ <br> $R_7 = -108.6$ | $T_4 = 2.01$ |

It so happens that a lens of this modified type has a covering power of about 26.5 degrees even without applying our invention. However, the astigmatism borders on the tolerance limits throughout a great portion of the field. For many purposes a covering power of 27 degrees is sufficient. However, by means of our invention this covering power may be extended somewhat and the astigmatism over the whole field is reduced to less than ½ of the tolerance limit. In other words, the lens is correct over a wide field within much more stringent tolerance limits than hitherto.

In order to more forcibly demonstrate the effect of our invention, we have in this particular example (Fig. 2) applied the invention more vigorously than is perhaps preferable. The Petzval radius has been increased to more than six times the focal length which causes both the sagittal and tangential fields to bend over backwards rather than to fall on opposite sides of the ideal flat plane. Because of this particular degree to which the invention has been applied to this lens, the covering power is only 26.5 degrees, but the astigmatism at 18 degrees, for example, is only ¼ per cent of the focal length. On the other hand, by applying the invention somewhat less vigorously so that the Petzval radius is between 4 and 5 times the focal length, and remaking all of the corresponding computations, the tangential and sagittal fields are made to appear on opposite sides of the ideal flat plane, the covering power is extended to beyond 27 degrees and a much flatter field is obtained throughout this range.

The most preferable embodiment of our invention is obtained when glasses having an index of refraction for the D line greater than 1.75 are used in the collective element of the cemented component of either the lens shown in Fig. 1 or the one shown in Fig. 2. However, some of the advantages of the invention are obtained when the index of refraction is between 1.70 and 1.75 (or even as low as 1.65 provided the $\nu$ value of chromatic dispersion is larger than 53).

As we pointed out above, there are certain features of this invention which appear and certain advantages which are obtained when the invention is applied to various ordinary types of photographic objectives. A portion of the increase in covering power may be attributed to these features of the invention, which features may be considered as being due to the combination of a high index collective element and a high index dispersive element, incorporated in the lens. If a simple achromat comprising a cemented doublet is made up and one attempts to apply our invention even to this simple achromat, one obtains advantages which have a definite value but which is of much less importance than in a highly corrected system. For example, the covering power is extended only slightly from a practical point of view. However, theoretically this increase in covering power and other similar small advantages are quite real and become of practical value when the lens is incorporated in a more complex system. For instance, in the systems herein shown, the compound elements 3—4 and 3'—4' are such simple doublets incorporated in more complex objectives. Furthermore, the advantages are maintained when this combination of collective and dispersive elements are spaced rather than cemented as shown in the copending application Serial No. 142,202 Frederick & Aklin filed concurrently herewith. It is possible to space these elements in a complex system but, as is well known to those skilled in this art, it is not desirable to do so in a simple achromat, since considerable distortion would be introduced thereby.

In view of all this, the invention may be further applied to the types of lenses shown in Figures 1 and 2 by making the front collective element of a high index glass and the single dispersive component of a high index glass whose index is equal to or less than that of the front component. In fact, certain advantages would be gained by using high index glasses in these two components and using low index glasses in the cemented component, but we prefer to use the form illustrated in the drawing or to use high index glasses throughout.

We are enabled to obtain the results particularly well by reason of the use of glass of the type described in the British Patent No. 462,304. In the examples given, lenses 4 and 3' are made of such glasses and in the preferred embodiments of our invention these take the place of barium crown in the collective element which is used in combination with a flint dispersive element also having a relatively large index of refraction but lower than that of the collective element and having a color-dispersive index $\nu$ lower than that of the positive.

It is to be understood that others of the glasses described in said British patent may be used by reason of the relation of their high index of refraction to the dispersive index but with any particular objective, it should be necessary of course to choose a complementary flint glass having a suitable index and to compute the objective embodying the principles herein outlined.

The degree and kind of advantage gained by our invention depends on the type of lens to which it is applied. It is to be understood that the invention is not limited to the specific structures shown but is of the scope of the appended claims.

What we claim and wish to protect by Letters Patent of the United States is:

1. A highly corrected photographic objective of high covering power and of the type having two collective components spaced axially on opposite sides of a biconcave element in which type the front collective component is single, has a front surface of which the radius of curvature is between ⅕ and ½ of the focal length of the objective and has a rear surface of which the radius of curvature has an absolute value greater than the focal length of the objective and in which type the rear collective component is compound consisting of a biconvex element cemented to a dispersive element, said objective being characterized by the collective components being made entirely of glasses whose index of refraction is in each case greater than 1.6 and said biconcave element having an index of refraction between 1.55 and 1.65, the algebraic sum of the Petzval powers of all individual surfaces being between .16 and .26 of the power of the objective and the cemented surface when convex to the front of the objective having a radius of curvature greater than one third of the focal length of the objective and when concave to the front of the objective having a radius of curvature whose absolute value is less than one fifth of the focal length of the objective.

2. A highly corrected photographic objective of the type having two collective components spaced axially on opposite sides of a biconcave element, the front collective component being single, having a front surface of which the radius of curvature is between ⅕ and ½ of the focal length of the objective and having a rear surface of which the absolute value of the radius of curvature is greater than said focal length, said objective being characterized by the rear collective component consisting of a dispersive element cemented to the front of a collective element, both elements being made of glass whose index of refraction is greater than 1.6, the cemented surface having a radius of curvature between ⅓ and ½ of said focal length, and the sum of the absolute values of this radius and that of the rear surface of the objective being greater than .9 times said focal length.

3. An objective according to claim 2 in which the algebraic sum of the Petzval powers of the individual surfaces is about ¼ of the power of the objective.

4. A highly corrected photographic objective of the type having two collective components spaced axially on opposite sides of a biconcave element, the front collective component being single, having a front surface of which the radius of curvature is between ⅕ and ½ of the focal length of the objective and having a rear surface of which the absolute value of the radius of curvature is greater than said focal length, said objective being characterized by the rear collective component consisting of a dispersive element cemented to the rear of a biconvex element, both elements being made of glass whose index of refraction is greater than 1.6, the cemented surface having a radius of curvature whose absolute value is between $\frac{1}{10}$ and ⅕ of said focal length, the sum of this value and the radius of the front surface of this component being greater than 1.3 times said focal length and said front surface being convex to the front of the objective with a radius of curvature greater than said focal length.

5. An objective according to claim 4 in which the algebraic sum of the Petzval powers of the individual surfaces is between ⅕ and ⅙ of the power of the objective.

CHARLES W. FREDERICK.
WILLY SCHADE.